US012476408B2

(12) United States Patent
Lord et al.

(10) Patent No.: US 12,476,408 B2
(45) Date of Patent: Nov. 18, 2025

(54) ELECTRICAL CONNECTOR COMPRISING A CONNECTOR POSITION ASSURANCE ELEMENT

(71) Applicant: Tyco Electronics France SAS, Pontoise (FR)

(72) Inventors: Steven Lord, Pontoise (FR); Xavier Rouillard, Pontoise (FR); Quentin Delestre, Pontoise (FR)

(73) Assignee: Tyco Electronics France SAS, Pontoise (FR)

( * ) Notice: Subject to any disclaimer, the term of this patent is extended or adjusted under 35 U.S.C. 154(b) by 404 days.

(21) Appl. No.: 17/743,649

(22) Filed: May 13, 2022

(65) Prior Publication Data

US 2022/0368057 A1 Nov. 17, 2022

(30) Foreign Application Priority Data

May 14, 2021 (FR) ...................................... 2105082

(51) Int. Cl.
*H01R 13/436* (2006.01)
*H01R 13/17* (2006.01)

(52) U.S. Cl.
CPC ......... *H01R 13/4362* (2013.01); *H01R 13/17* (2013.01)

(58) Field of Classification Search
CPC .................... H01R 13/4362; H01R 13/15–187
(Continued)

(56) References Cited

U.S. PATENT DOCUMENTS 3,660,804 A * 5/1972 Bebber, Jr. ............. H01R 24/44 439/578
6,149,448 A 11/2000 Haller et al.
(Continued)

FOREIGN PATENT DOCUMENTS

CN 101682140 A 3/2010
CN 105531886 A 4/2016
(Continued)

OTHER PUBLICATIONS

Japanese Office Action dated Jul. 4, 2023 with English translation, corresponding to Application No. 2022-077835, 11 pages.
(Continued)

*Primary Examiner* — Ross N Gushi
*Assistant Examiner* — Gregory L Mangot
(74) *Attorney, Agent, or Firm* — Barley Snyder

(57) ABSTRACT

An electrical connector for connecting with a mating electrical connector in a mating direction includes an electrically conductive terminal having an electrical contact, a housing having a plug-in portion insertable into the mating electrical connector along the mating direction, the plug-in portion having a receptacle receiving the electrical contact, a compressive member arranged within the housing and compressed along the mating direction, and a connector position assurance element (CPA) slidable from an unlocked position to a locked position along the mating direction. The locked position allows the electrical connector to be locked to the mating connector when the electrical connector is connected to the mating connector. A central axis of the compressive member is aligned with a central axis of the plug-in portion in the mating direction.

20 Claims, 5 Drawing Sheets

(58) Field of Classification Search
USPC .......................................................... 439/459
See application file for complete search history.

(56) References Cited

U.S. PATENT DOCUMENTS

| | | | | |
|---|---|---|---|---|
| 6,167,808 | B1 * | 1/2001 | Mramor | H01R 24/58 280/743.1 |
| 8,968,021 | B1 * | 3/2015 | Kennedy | H01R 13/641 439/352 |
| 2002/0146942 | A1 | 10/2002 | Bolen et al. | |
| 2013/0072054 | A1 | 3/2013 | Hotea et al. | |
| 2014/0154911 | A1 | 6/2014 | Matsumoto et al. | |
| 2015/0056841 | A1 * | 2/2015 | Siwek | H01R 13/6271 439/352 |
| 2015/0118885 | A1 | 4/2015 | Holub et al. | |
| 2019/0173220 | A1 * | 6/2019 | Bhat | H01R 13/4362 |
| 2019/0288452 | A1 | 9/2019 | Lord et al. | |

FOREIGN PATENT DOCUMENTS

| | | | |
|---|---|---|---|
| DE | 102004026665 | A1 | 12/2005 |
| EP | 0919074 | A1 | 6/1999 |
| EP | 3166185 | A1 | 9/2014 |
| JP | 2010537370 | A | 12/2010 |
| JP | 2014110182 | A | 6/2014 |
| JP | 2014127318 | A | 7/2014 |
| WO | 2008148748 | A1 | 12/2008 |
| WO | 2009023200 | A2 | 2/2009 |
| WO | 2015036611 | A1 | 3/2015 |
| WO | 2015088636 | A1 | 6/2015 |

OTHER PUBLICATIONS

Korean Office Action dated Dec. 20, 2023 with English translation, corresponding to Application No. 10-2022-0059009, 12 pages.

Examination Report from the Intellectual Property of India dated Nov. 22, 2022, corresponding to Application No. 202244026727, 5 pages.

French International Report, Application No. FR2105082, Dated: Nov. 25, 2021, 8 pages.

Chinese Office Action dated May 28, 2025 with English translation, corresponding Application No. 202210517333.6, 16 pages.

* cited by examiner

[Fig. 1]
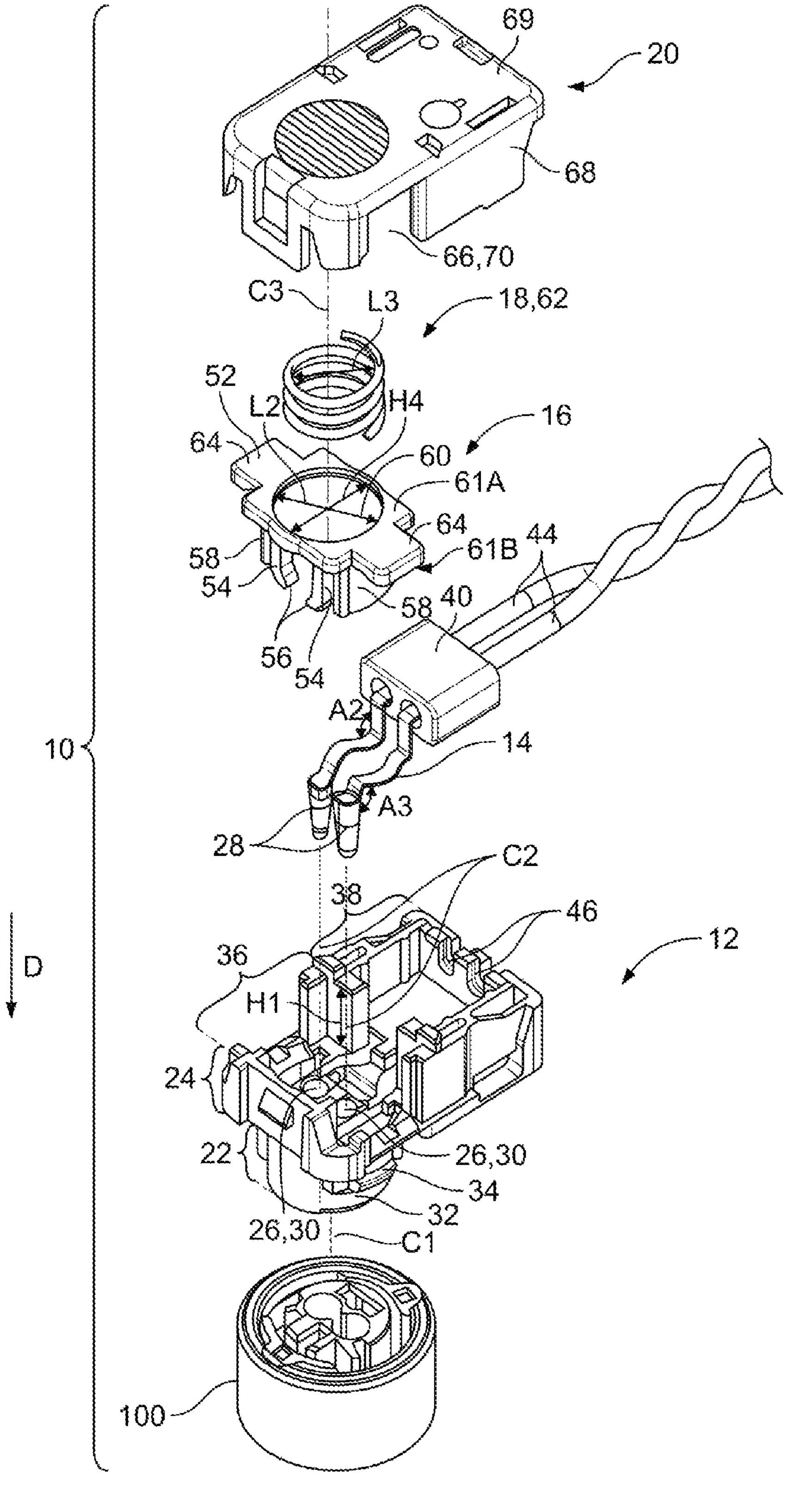

[Fig. 2]
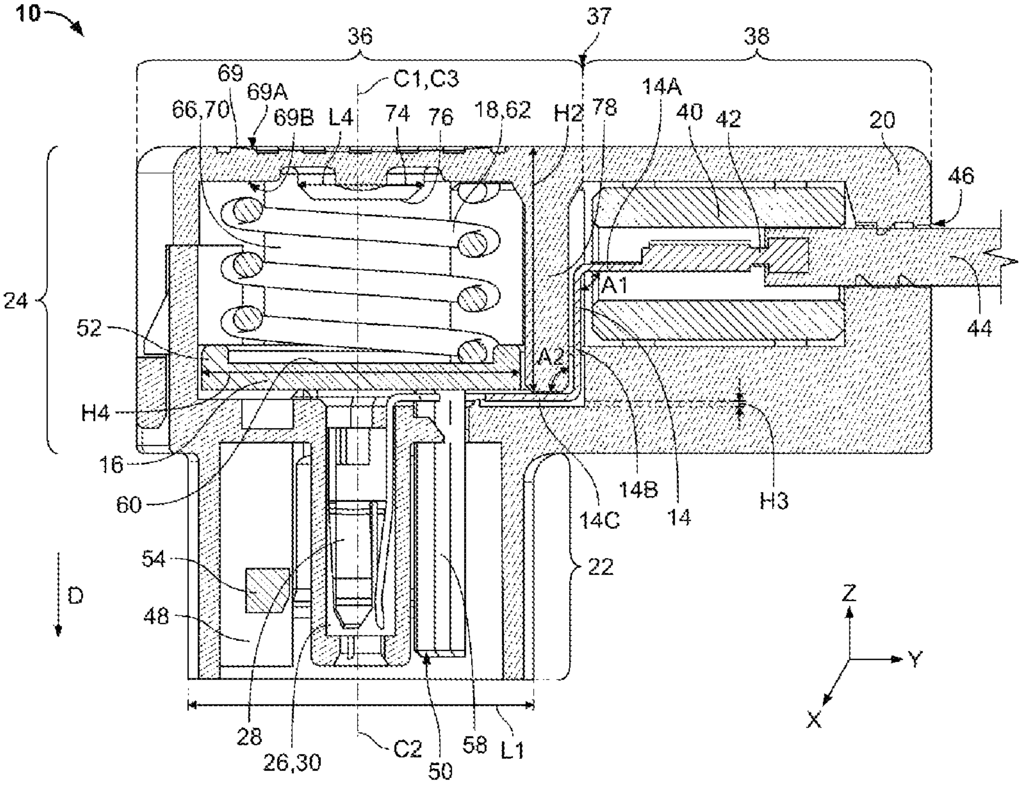

[Fig. 3]
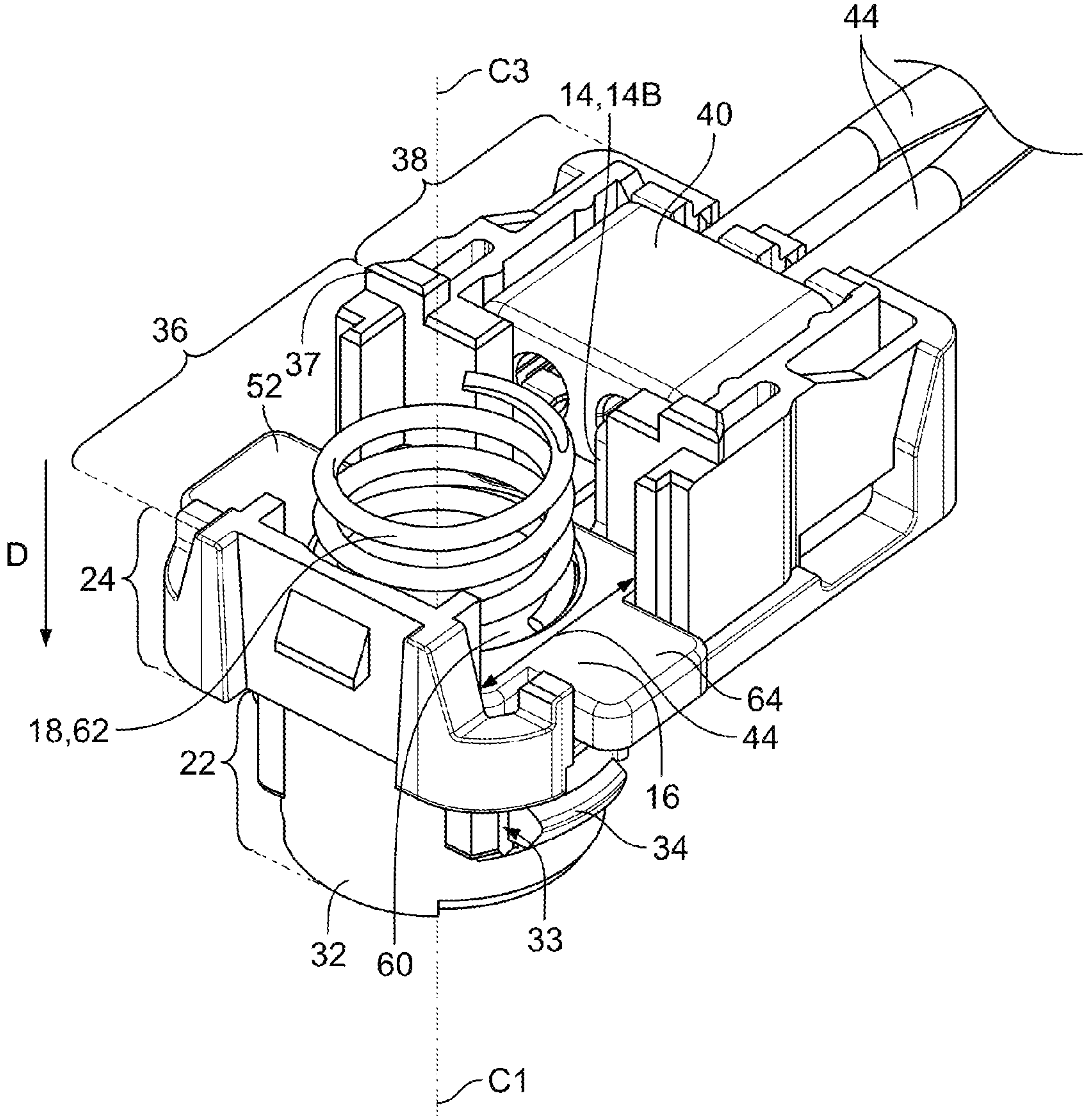

[Fig. 4]
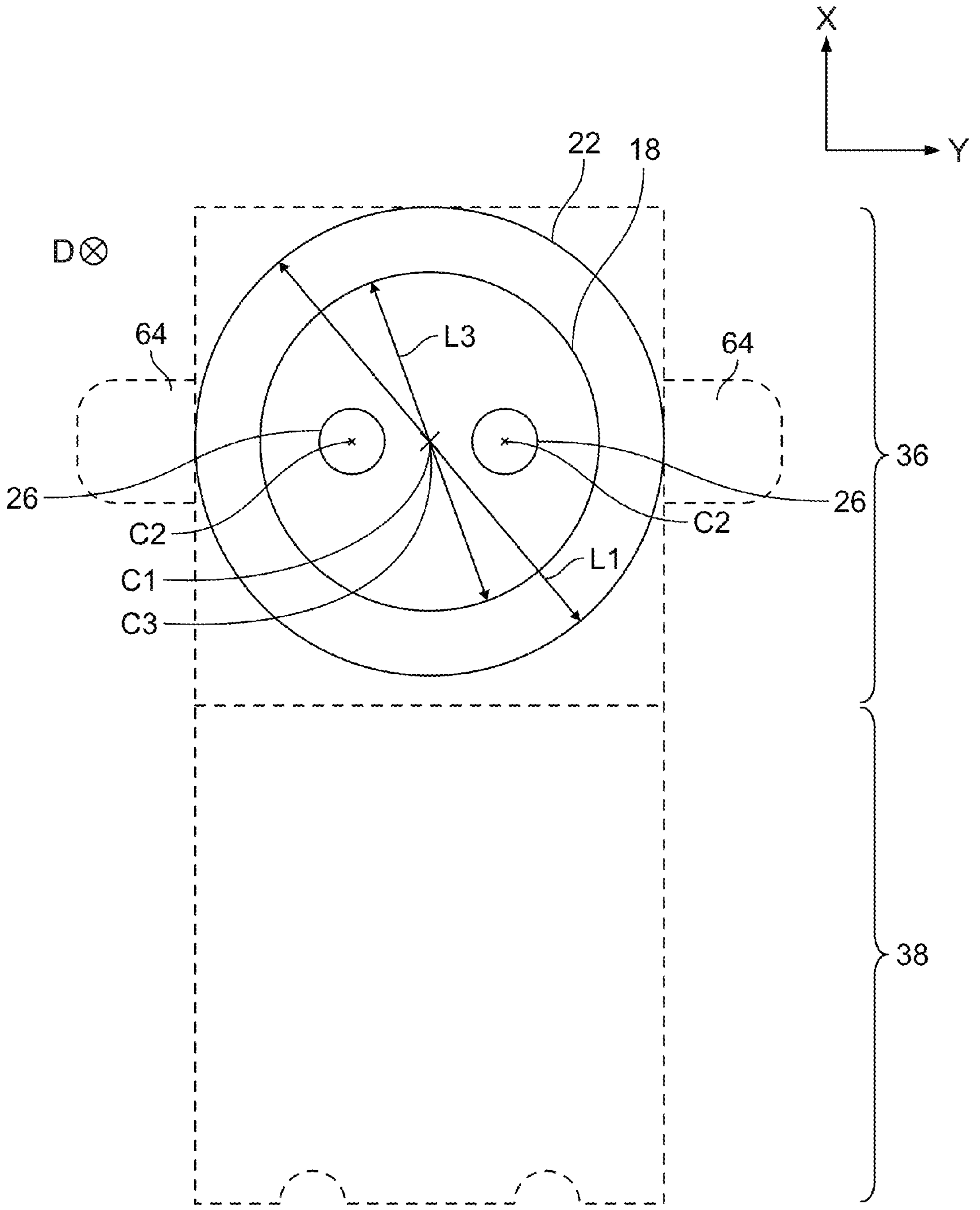

[Fig. 5]
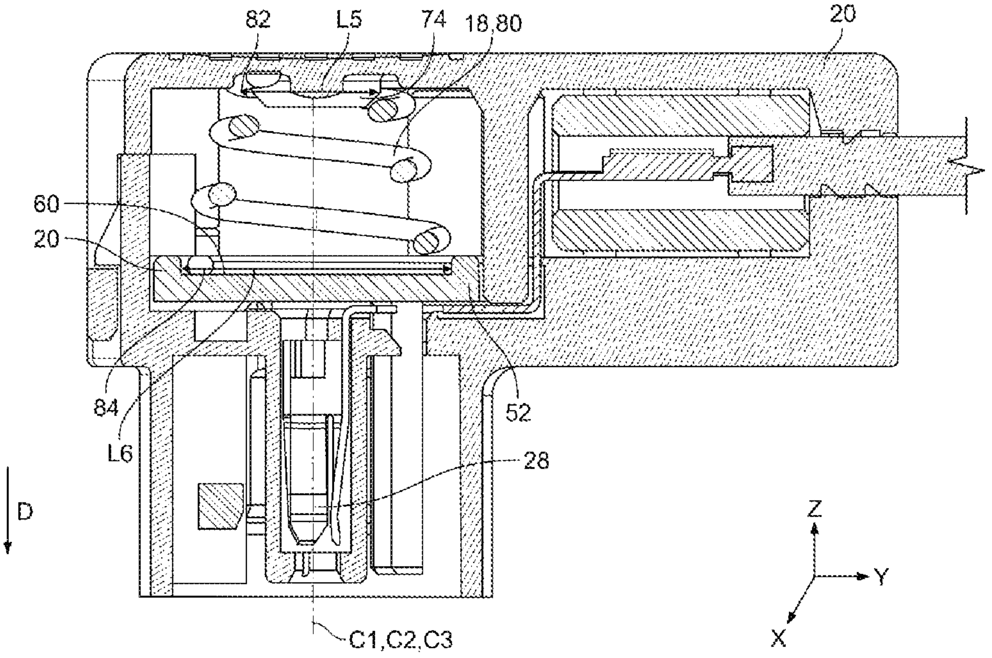

ELECTRICAL CONNECTOR COMPRISING A CONNECTOR POSITION ASSURANCE ELEMENT

CROSS-REFERENCE TO RELATED APPLICATIONS

This application claims the benefit of the filing date under 35 U.S.C. § 119(a)-(d) of French Patent Application No. 2105082, filed on May 14, 2021.

FIELD OF THE INVENTION

The present invention relates to an electrical connector and, more particularly, to an electrical connector having a connector position assurance element.

BACKGROUND

It is known, in particular in the field of electrical connections for the automobile industry, to use connectors comprising compressive members. A compressive member is usually one traditional spring of the helical type arranged in the connector and makes it possible to push back a mating electrical connector during an attempt to couple the electrical connector to the mating electrical connector, as long as the force applied on the electrical connector and/or the mating electrical connector is not sufficient to couple them correctly. In such systems, it is known that the compressive member is relaxed in the electrical connector in its delivery position, i.e., before any attempt at connecting it to a mating connector, and compressed in its axial direction during a coupling attempt with the mating electrical connector. The compression of the compressive member opposes the coupling direction of the mating electrical connectors. Thus, as long as the force exerted to couple the two mating electrical connectors is not sufficient to complete the coupling, i.e., to allow the locking of the two mating electrical connectors with each other, the force created by the compression of the compressive member makes it possible to push the mating electrical connector back in a direction opposite the coupling direction, thereby avoiding the possibility of an incorrect connection.

In the connectors known from the state of the art, the compression of the compression member must therefore be high enough to allow good ejection of the mating electrical connectors if they are not completely locked with each other. In order to obtain the desired functionality, it is known that the compression member uses at least one spring.

It is also known from the state of the art to use connector position assurance (CPA) elements, making it possible to monitor and ensure proper coupling of an electrical connector to a mating connector. In the automobile industry, it is in particular known to use CPA elements on the one hand to make sure that two mating electrical connectors are correctly coupled and locked, and on the other hand to strengthen the locking of the mating electrical connectors through additional locking, one purpose of which is to avoid unwanted disconnection of the mating electrical connectors for example due to the many impacts and strong vibrations regularly experienced by the connecting elements of motor vehicles.

The safety restraint systems commonly used in motor vehicle seat belts or air bags comprise pyrotechnic devices that can activate the locking of a belt or the inflation of an airbag based on impact or vibration information received by sensors of the vehicle. It is also known that the electrical cables connect a control unit of a sensor to a corresponding pyrotechnic device, or squib, end in an electrical connector, which is generally connected to a mating electrical connector receptacle, or squib carrier.

The airbag squib systems of motor vehicles use standardized squib connectors, the standard for which requires a high degree of compactness and therefore small dimensions relative to connectors used for other systems or electric elements of the vehicle. The standard imposes dimensions that are incompatible with the space necessary for the travel of locking springs like those used in the known spring-lock connectors of the state of the art.

Document WO 2015/088636 A1 in particular discloses a self-rejecting automotive harness connector comprising one helical compression spring arranged in the housing of the connector between a cover and a connector position assurance (CPA) element. The arrangement of the helical compression spring as known from WO 2015/088636 A1, however, does not allow distributing the compressive force uniformly with respect to the housing. Moreover, an involuntary contact between the helical compression spring and the electrically conductive terminal is not well prevented. The design according to WO 2015/088636 A1 also requires that the helical compression spring comprises a sufficient amount of spires for sustaining the mechanical stress resulting from the mating operations. Thereby, the helical compression spring as known from WO 2015/088636 A1 has to be provided with a minimum length, which does not allow for further size reduction of the housing.

SUMMARY

An electrical connector for connecting with a mating electrical connector in a mating direction includes an electrically conductive terminal having an electrical contact, a housing having a plug-in portion insertable into the mating electrical connector along the mating direction, the plug-in portion having a receptacle receiving the electrical contact, a compressive member arranged within the housing and compressed along the mating direction, and a connector position assurance element (CPA) slidable from an unlocked position to a locked position along the mating direction. The locked position allows the electrical connector to be locked to the mating connector when the electrical connector is connected to the mating connector. A central axis of the compressive member is aligned with a central axis of the plug-in portion in the mating direction.

BRIEF DESCRIPTION OF THE DRAWINGS

The invention will now be described by way of example with reference to the accompanying Figures, of which:

FIG. 1 is an exploded perspective view of an electrical connector according to an embodiment and a mating electrical connector;

FIG. 2 is a sectional side view of the electrical connector;

FIG. 3 is a perspective view of a portion of the electrical connector;

FIG. 4 is a top view of the electrical connector; and

FIG. 5 is a sectional side view of an electrical connector according to another embodiment.

DETAILED DESCRIPTION OF THE EMBODIMENT(S)

The accompanying drawings are merely for the purpose of illustrating examples of how the invention can be made and used, and are not to be construed as limiting the invention to only the illustrated and described embodiments. Furthermore, several aspects of the embodiments may form—individually or in different combinations—solutions according to the present invention. The following described embodiments thus can be considered either alone or in an arbitrary combination thereof. Further features and advantages will become apparent from the following more particular description of the various embodiments of the invention, as illustrated in the accompanying drawings.

FIG. 1 represents an exploded view of an electrical connector 10 according to a first embodiment of the present invention and a mating electrical connector 100. The electrical connector 10 is configured to be mated with the mating electrical connector 100 along a mating direction D. In an embodiment, the electrical connector 10 is a squib connector for a safety restraint system of a motor vehicle.

The electrical connector 10 corresponds to the assembly of several elements shown in FIG. 1: a housing 12, at least one electrically conductive terminal 14, a connector position assurance element 16 (referred as "CPA 16" in the following), a compressive member 18, and a cover 20.

The housing 12 of the electrical connector 10 comprises two main portions 22, 24, as shown in FIG. 1: a plug-in portion 22 and a receiving portion 24. The housing 12 is integrally formed, for example by injecting molding.

The plug-in portion 22 is the portion of the housing 12 insertable into the mating electrical connector 100 along the mating direction D. The plug-in portion 22 is thus of suitable geometry for being plugged in the mating electrical connector 100. In the example illustrated in FIG. 1, the plug-in portion 22 is substantially cylindrical with a diameter L1 (the diameter L1 is visible in FIG. 2).

The plug-in portion 22 has a central axis C1. The central axis C1 passes through the center of gravity of the plug-in portion 22. The central axis C1 is parallel to the mating direction D. In the case wherein the plug-in portion 22 is substantially cylindrical, as illustrated in FIG. 1, the central axis C1 also corresponds to the central longitudinal axis and to the axis of revolution of the plug-in portion 22. All these axes, represented by C1 in FIG. 1, pass through the center of gravity of the plug-in portion 22. Moreover, all these axes, represented by C1 in FIG. 1, are parallel to the mating direction D.

The plug-in portion 22 comprises two receptacles 26 configured for receiving electrical contacts 28 of the electrically conductive terminals 14. The number of receptacles 26 is adapted to the number of electrical contacts 28. The receptacles 26 are of suitable geometry for accommodating the electrical contacts 28. In particular, each receptacle 26 respectively forms a tunnel 30 within the plug-in portion 22. A central longitudinal axis C2 of each tunnel 30 (i.e. of each receptacle 26) is parallel to the central axis C1 of the plug-in portion 22. The tunnels 30 are hollow cylindrical openings 30 with complementary dimensions (in particular in diameter and length) to the electrical contacts 28.

Provided at an external circumference 32 of the plug-in portion 22, said plug-in portion 22 comprises two locking lances 34 (only one is visible in the view of FIG. 1), which can be deflected inwardly, i.e. towards an inside of the plug-in portion 22 in a respective deflection space (shown in FIG. 3 with the reference 33) in order to allow the insertion of the plug-in portion 22 in the mating electrical connector 100.

As mentioned above, the housing 12 further comprises a receiving portion 24. In the example illustrated by FIG. 1, the receiving portion 24 is of substantially parallelepipedal geometry. In the example illustrated by FIG. 1, the receiving portion 14 comprises a first region 36 configured for receiving the CPA 16 slidingly therein and a second region 38 configured for receiving the electrically conductive terminals 14 and a ferrite bead 40.

In another embodiment, the electrically conductive terminals 14 are not provided with a ferrite bead 40.

The electrically conductive terminals 14 are terminated by the electrical contacts 28. The electrically conductive terminals 14 pass through the ferrite bead 40. In the ferrite bead 40, as shown in FIG. 2, the electrically conductive terminals 14 are crimped to electrical conductors 42. The electrical conductors 42 exit the receiving portion 24 through cables 44 passing via openings 46 of the receiving portion 24. In the example illustrated in FIG. 2, the electrically conductive terminals 14 are bent at three locations. In other embodiments, the electrically conductive terminals 14 can be bent at one location only, or at two locations only, or, at four or more locations.

As shown in FIG. 2, a first bend of the electrically conductive terminals 14 (only visible in FIG. 2, see section of the electrically conductive terminals 14 indicated by reference 14A) forms a right angle A1 with respect to the electrical conductors 42. The first bend (i.e. the right angle A1) is located at a junction 37 between the first region 36 and the second region 38.

A second bend of the electrically conductive terminals 14 forms a right angle A2 between two sections 14B, 14C of the electrically conductive terminal 14 in the first region 36, as shown in FIG. 2.

A third bend of the electrically conductive terminals 14 forms a right angle A3 between the section 14C of the electrically conductive terminal 14 and the electrical contact 28 at a junction between the first region 36 and the plug-in portion 22, as shown in FIG. 2.

Hence, the second bend forming the right angle A2 is disposed between the first bend (A1) and the third bend (A3).

The electrically conductive terminals 14 thus comprises three bent sections 14A, 14B and 14C. The first section 14A is perpendicular to the second section 14B, that is itself perpendicular to the third section 14C. The first section 14A is parallel to the third section 14C. As further explained thereafter, the bent design of the electrically conductive terminals 14 allow providing shorter electrical contacts 28. Hence, raw material can be saved for manufacturing the electrically conductive terminals 14 used within the electrical connector 10 according to the present invention.

The plug-in portion 22 extends substantially perpendicularly from the receiving portion 24 at the first region 36. The receptacles 28 of the plug-in portion 22 thus correspond to tunnels 30 leading to the first region 36 of the receiving portion 24. Hence, the electrical contacts 28 can be accommodated into the receptacles 38 of the plug-in portion 22 via the first region 36 of the receiving portion 24 along the mating direction D, as shown by the exploded view of FIG. 1.

The CPA 16 is also configured to be accommodated in the plug-in portion 22 via the first region 36 of the receiving portion 24 along the mating direction D. To this end, the plug-in portion 22 comprises longitudinal openings 48, 50, shown in FIG. 2, extending along a direction parallel to the mating direction D, for receiving some portions of the CPA 16 in the mating direction D.

The CPA 16 is slidable from an unlocked position to a locked position along the mating direction D. The locked position of the CPA 16 allows the electrical connector 10 to be locked to the mating connector 100 when the connectors 10, 100 are properly mated together.

The CPA 16 according to the present invention, as shown in FIG. 1, comprises a substantially flat head 52 from which extends perpendicularly two latching arms 54 along the mating direction D. Each latching arm 54 ends with a hook 56. The latching arms 54 and their corresponding hooks 56 are configured to prevent relative movement between the CPA 16 and the housing 12 in the locked position. The latching arms 54 are configured to be received in the longitudinal openings 48 of the plug-in portion 22, shown in FIG. 2.

As shown in FIG. 1, further tabs 58 extend perpendicularly from the head 52 of the CPA 16 in the same direction as the latching arms 54. The tabs 58 are configured to be received in the longitudinal openings 50 of the plug-in portion 22, shown in FIG. 2. The tabs 58 provide further mechanical support, and thus stability, to the CPA 16 in the locked position.

As mentioned above, the head 52 of the CPA 16 is essentially flat. It allows providing a flat surface 61A onto which the compressive member 18 can be compressed, thereby facilitating a homogeneous distribution of compressive forces thanks to the flat geometry of the CPA head 52. Hence, the CPA 16 is further rendered more robust and stable.

Under the action of a force applied to the CPA 16 by the compressive member 18, the CPA 16 can be slid in the mating direction D. In particular, the CPA 16 can be slid from the unlocked position to the locked position, thereby providing the function of a CPA 16 to the electrical connector 10.

In the first embodiment, the head 52 of the CPA 16 comprises a circular recess 60 on the surface 61A (or side 61A) opposite to the side 61B from which extend the latching arms 54 and the tabs 58. The circular recess 60 has a diameter L2. The diameter L2 of the circular recess 60 is adapted to a diameter L3 of the compressive member 18.

In another embodiment, instead of a circular recess 60, the head 52 is provided with a protuberance having an essentially cylindrical or conical shape having a base of diameter L2.

When the compressive member 18 is a cylindrical compression spring 62, like in the first embodiment shown in FIG. 1, the diameter L3 of the compressive member 18 corresponds to the diameter L3 of each coil. It is noted that the diameter of each coil of a cylindrical compression spring is identical to each other.

When the compressive member 18 is a conical compression spring, like in a second embodiment of the present invention (shown in FIG. 5), the diameter L3 corresponds to the diameter of the greater coil of the conical compression spring. This aspect is further described thereafter in reference to FIG. 5.

The circular recess 60 (or protuberance) of the CPA 16 provides a retention device for holding and stabilizing the compressive member 18. Indeed, the circular recess 60 forms a circular border that can enclose the portion of the compressive member 18 located in the circular recess 60. A good retention of the compression member 18 is particularly needed for automotive applications, wherein the electrical connector 10 can face chocks and vibrations.

The head 52 of the CPA 16 further comprises two opposite end-portions 64, distinct from the circular recess 60, that provides handling portions for grasping the CPA 16 and/or a visual indicator of the CPA 16 position to an operator. As shown in FIG. 1, the two opposite end-portions 64 are formed by the surfaces 61A, 61B of the head 52 of the CPA 16.

The compressive member 18 has a central axis C3. As indicated above, in the first embodiment shown in FIG. 1, the compressive member 18 is a cylindrical compression spring 62. The central axis C3 of the cylindrical compression spring 62 corresponds to the central longitudinal axis of the cylindrical compression spring 62. Under compression, in particular in the mating direction D, the compression forces applied to the compression member 18 act along the central axis C3. Thus, the central axis C3 of the compression member 18 also corresponds to a compression axis of the compression member 18. The central axis C3 of the compression member 18 is parallel to the mating direction D.

The electrical connector 10 further comprises the cover 20. The cover 20 has a shape substantially complementary to the housing 12 and can engage the housing 12 by a snap-fit connection. Thereby, a rigid and unitary connector 10 enclosing the electrically conductive terminals 14 is obtained. The electrical contacts 28, the electrically conductive terminals 14 and the ferrite bead 40 are thus enclosed within the electrical connector 10 by the cover 20.

The cover 20 comprises two openings 66 (only one is visible in FIG. 1) having a U-shape and provided on a lateral wall 68 of the cover 20. The lateral wall 68 partially extends perpendicularly from a main face 69 of the cover 20. The openings 66 respectively provide passages 70 for the end-portions 64 of the head 52 of the CPA 16. Hence, the end-portions 64 of the CPA 16 remains accessible to an operator, even when the cover 20 is snap-fit to the housing 12. The CPA 16 is at least partially enclosed by the cover 20, so that a loss of the CPA 16 can also be prevented. However, a portion of the CPA 16 can protrude from the enclosure formed by the cover 20 and the housing 12, as so to provide a handling portion and/or a visual indicator of the CPA 16 position to an operator.

The main face 69 is substantially flat. As shown in FIG. 2, a first surface 69A of the main face 69 is exposed to the external environment. A second surface 69B, opposite to the first surface 69A, corresponds to the inner surface of the cover 20, i.e. the surface 69B that is positioned within the electrical connector 10 and that is, thus, not exposed to the external environment.

Still in reference with FIG. 2, the surface 69B of the cover 20 is provided with a protuberance 74 having an essentially cylindrical shape. The free end 76 of the protuberance 74 can be a chamfered end. The protuberance 74 has a diameter L4 adapted to the diameter L3 of the compressive member 18. Hence, the compressive member 18 can be inserted around the protuberance 74, as shown in FIG. 2, and retain thereto. In particular, the compressive member 18 can be retained to the protuberance 74 by friction fit i.e. by interference fit. In a variant, the protuberance 74 can be of a substantially conical shape with a base having the diameter L4.

As shown in FIG. 2. a wall 78 extends perpendicularly from the surface 69B of the cover 20. The wall 78 has a height H2, slightly smaller than a height H1 of the first region 36 at the junction 37 (H1 is indicated in FIG. 1). The difference H3 (shown in FIG. 2) between the heights H1 and H2 is adapted to pass the electrically conductive terminals 14, in particular at the right angle A2.

As shown in FIG. 2, and in comparison with FIG. 3 wherein the cover 20 is not represented, the wall 78 of the cover 20 allows providing an electrically insulating barrier between the compressive member 18 and the electrically conductive terminals 14, in particular with the section 14B of each electrically conductive terminal 14. Thereby, the risk of short-circuit between the compressive member 18 and the electrically conductive terminals 14 can be reduced.

As shown in FIG. 2, representing an assembled state of the electrical connector 10, the compressive member 18 is held between the CPA 16 and the cover 20. More precisely, the compressive member 18 is held, for instance by friction fit and by press fit, between the circular recess 60 of the CPA 16 and the protuberance 74 of the cover 20.

According to the present invention, the compressive member 18 is arranged within the first region 36 of the receiving portion 24 of the housing 12 such that the central axis C3 of the compressive member 18 is essentially aligned with a central axis C1 of the plug-in portion 22. The alignment of the axis C1, C3 is further illustrated by the top view of FIG. 4. The aligned axis C1, C3 are parallel to the mating direction D. The axis C1, C3 passes through the center of the circular recess 60 of the head 52 of the CPA 16.

The alignment of the axis C1, C3 allows improving the force distribution applied on the housing 12 during the mating operation along the mating direction D. Indeed, during the compression of the compressive member 18, which exerts a reaction force along its central axis C3, parallel to the mating direction D, the specific arrangement of the compressive member 18 within the electrical connector 10 homogeneously distributes the applied forces with respect to the plug-in portion 22 of the housing 12. A uniform strain is thus applied on the plug-in portion 22 of the housing 12. Thereby, the electrical connector 10 according to the present invention is rendered more stable, especially during mating operations. Hence a more resistant and more reliable electrical connector 10 than the connectors known from the prior art is provided.

Furthermore, the design and the arrangement of the CPA 16 according to the present invention helps preventing contact (and thus short circuits) between the electrically conductive terminals 14 and the compressive member 18. This is because the essentially flat head 52 of the CPA 16 is dimensioned for covering the plug-in portion 22, so as to integrally cover the receptacles 26 wherein the electrical contacts 28 are inserted thereinto. In particular, the essentially flat head 52 of the CPA 16 has a width H4 substantially equivalent to the diameter L1 of the plug-in portion 22.

As shown in FIG. 2 and FIG. 3, the head 52 of the CPA 16 provides an electrically insulating barrier between the compressive member 18 and the electrical contacts 28, as well as with the section 14C of each electrically conductive terminal 14. Indeed, as shown in FIG. 2, the section 14C of the electrically conductive terminal 14 is physically separate from the compressive member 18 by the presence of the housing 12, the wall 78 of the cover 20 and the head 52 of the CPA 16. The section 14B is in fact covered by the wall 78 of the cover 20 while the section 14C is covered by the head 52 of the CPA 16. The cover 20 and the CPA 16 are made of plastic and are therefore electrically insulating.

Moreover, as the CPA 16 integrally covers the at least one receptacle 26, the CPA 16 also acts as a lid for the receptacle 26, thereby preventing any direct access to the receptacle 26 and the electrical contact 28 arranged therein.

Further, as the dimension of the head 52 of the CPA 16 according to the present invention allows providing a CPA 16 with a large surface 61A, i.e. essentially as large as the diameter L1 of the plug-in portion 22, a compressive member 18 with a larger diameter L3 than in the state of the art can be used. Hence, it allows using a compressive member 18, larger than the ones used in the state of art, and with a smaller height (i.e. the length along the compressive axis) than the ones used in the state of art, for an equivalent compressive force. As a result, because the height of the compressive member 18 can be reduced, the height H1 of the receiving portion 24 can be reduced, thereby advantageously providing a more compact housing 12.

Moreover, the multi-bent sections 14A, 14B, 14C at right angles A1, A2, A3 allow providing electrically conductive terminals 14 with shorter electrical contacts 28 than in the state of the art. It therefore allows using less raw material for the electrically conductive terminals 14 and their electrical contacts 28.

In a second embodiment, as illustrated in FIG. 5, the compressive member 18 can be a conical compression spring 80. Elements with the same reference numeral already described and illustrated in FIGS. 1 to 4 will not be described in detail again but reference is made to their description above.

The conical compression spring 80 has one first free-end 82 and a second free-end 84. The coil at the first free-end 82 of the conical compression spring 80 has a diameter L5. The coil at the second free-end 84 of the conical compression spring 80 has a diameter L6. The diameter L6 is greater than the diameter L5 because the compression spring 80 is conical. The first free-end 82 is arranged around the protuberance 74 and thus hold to the cover 20. In particular, the first free-end 82 can be hold to the cover 20 by friction fit. The second free-end 84 is arranged within the circular recess 60 of the head 52 of the CPA 16.

The diameter of the successive coils of the conical compression spring 80 thus increases in the mating direction D.

In another embodiment, the diameter of the successive coils of the conical compression spring 80 can increase in a direction opposite to the mating direction D. The conical compression spring 80 provides a compact and space-saving compressive member 18 as the spring coils fit into each other under compression along the mating direction D.

In another embodiment, the compressive member 18 is a multi-waves compression spring or an elastomer spring. Multi-waves compression springs provide a further compact and space-saving compressive member. In particular, the height of such compressive member can be reduced, in comparison with a cylindrical or conical compression spring, for the same compression force. Elastomer springs allow providing an electrically insulating compressive member.

In another embodiment, the housing 12 comprises at least two compressive members 18 arranged such that the respective central axis C3 of each compressive member 18 is essentially aligned with the central axis C1 of the plug-in portion 22 of the housing 12 in the mating direction D. Hence, an alternative arrangement can be obtained, providing an even more robust and thus reliable electrical connector 10 because of the plurality of compressive members 18.

Although the embodiments have been described in relation to particular examples, the invention is not limited and numerous alterations to the disclosed embodiments can be made without departing from the scope of this invention. The various embodiments and examples include individual features can be freely combined with each other to obtain further embodiments or examples according to the invention.

What is claimed is:

1. An electrical connector for connecting with a mating electrical connector in a mating direction, comprising:

an electrically conductive terminal having an electrical contact;

a housing having a plug-in portion insertable into the mating electrical connector along the mating direction, the plug-in portion having a receptacle receiving the electrical contact;

a compressive member arranged within the housing and compressed along the mating direction, a central axis of the compressive member is coaxially aligned with a central axis of the plug-in portion in the mating direction; and a connector position assurance element (CPA) slidable from an unlocked position to a locked position along the mating direction, the locked position allows the electrical connector to be locked to the mating connector when the electrical connector is connected to the mating connector, a generally planar bottom surface of the CPA opposite to the compressive member opposes a planar first section of the terminal in the mating direction.

2. The electrical connector of claim 1, wherein the compressive member exerts a reaction force along the central axis of the compressive member.

3. The electrical connector of claim 1, wherein the CPA has a head and a latching arm extending from the head.

4. The electrical connector of claim 1, wherein the compressive member is partially arranged in a recess of the CPA.

5. The electrical connector of claim 1, wherein the housing has a receiving portion receiving the electrically conductive terminal.

6. The electrical connector of claim 1, wherein the compressive member is a cylindrical compression spring, a conical compression spring, a multi-waves compression spring, or an elastomer spring.

7. The electrical connector of claim 1, wherein the electrical connector is a squib connector for a safety restraint system of a motor vehicle.

8. The electrical connector of claim 1, wherein, with the CPA in the locked position, the generally planar bottom surface of the CPA opposite to the compressive member abuts the planar first section of the terminal in the mating direction.

9. The electrical connector of claim 1, wherein at least a portion of the compressive member is arranged over the planar first section in the mating direction.

10. The electrical connector of claim 3, wherein the compressive member is arranged around a protuberance of the head of the CPA.

11. The electrical connector of claim 3, wherein the head of the CPA integrally covers the receptacle receiving the electrical contact.

12. The electrical connector of claim 3, wherein the latching arm prevents relative movement between the CPA and the housing in the locked position.

13. The electrical connector of claim 12, wherein the compressive member is arranged on the head.

14. The electrical connector of claim 1, further comprising a cover attached to the housing.

15. The electrical connector of claim 14, wherein the cover encloses the compressive member and partially encloses the CPA.

16. The electrical connector of claim 14, wherein the compressive member is partially arranged in a recess of the cover.

17. The electrical connector of claim 14, wherein the compressive member is arranged around a protuberance of the cover.

18. The electrical connector of claim 1, wherein the terminal further includes a second section extending perpendicularly from a first end of the first section in a direction opposite the mating direction and opposite a direction of extension of the electrical contact.

19. The electrical connector of claim 18, wherein the terminal further includes a third section extending perpendicularly from an end of the second section opposite the first section.

20. The electrical connector of claim 18, wherein the electrical contact extends perpendicularly from a second end of the first section in the mating direction.

* * * * *